Figure 1:
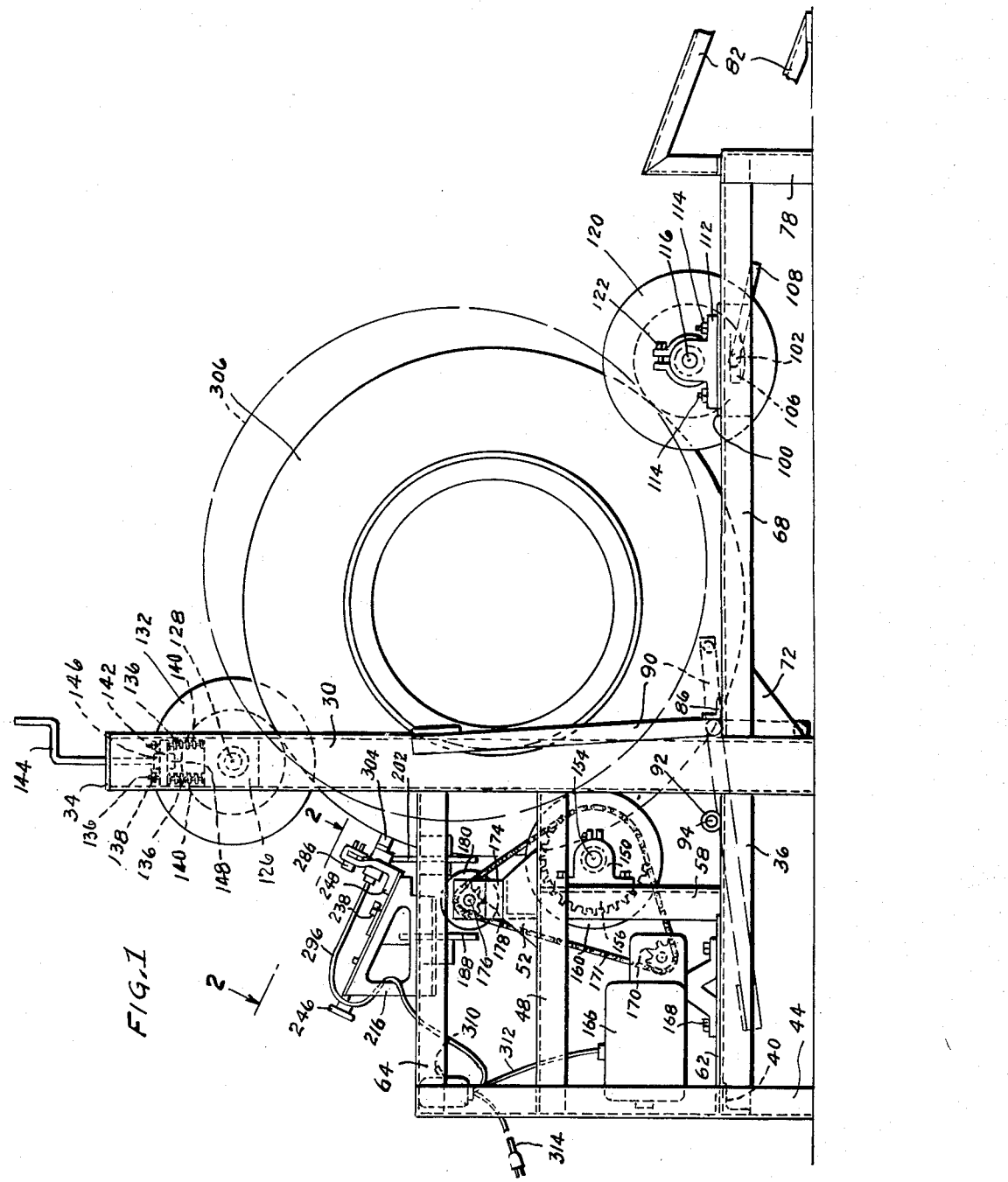

INVENTOR
MILLARD LOVE
BY Rey Eilers
ATT'Y.

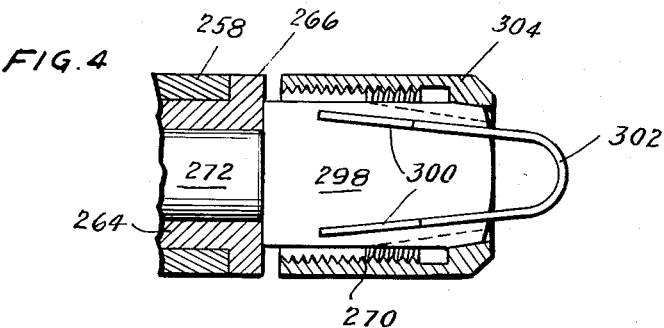
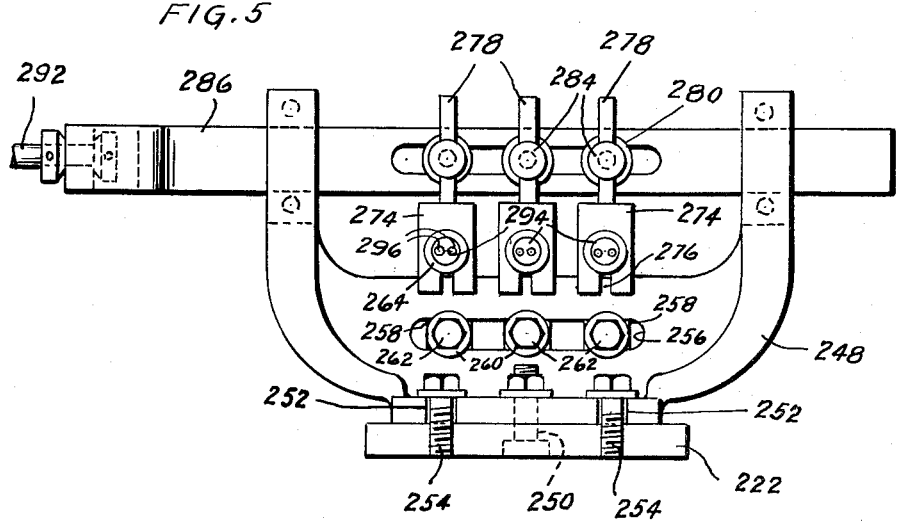
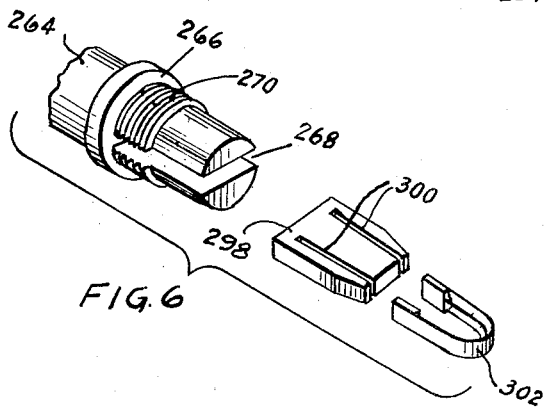

United States Patent Office 2,995,183
Patented Aug. 8, 1961

2,995,183
CUTTER HEAD FOR A TIRE GROOVING MACHINE
Millard Love, St. Louis, Mo.
(632 County Hill Drive, Rock Hill 19, Mo.)
Original application May 24, 1954, Ser. No. 431,981, now Patent No. 2,891,605, dated Jan. 23, 1959. Divided and this application Oct. 13, 1958, Ser. No. 766,830
4 Claims. (Cl. 157—13)

This invention relates to improvement in a cutter head for a tire grooving machine. More particularly this invention relates to improvements in machines that can groove truck and automobile tires.

It is therefore an object of the present invention to provide an improved machine that can groove truck and automobile tires.

This is a division of my co-pending application Serial No. 431,981 which was filed May 24, 1954, and became Patent No. 2,891,605 on January 23, 1959.

After a vehicle tire has been run for quite a while, the tread will wear away and leave the surface of the tire "bald." Such tires are quite safe, from the structural point of view, but they are not safe from the point of view of skidding on wet or icy streets. Those tires can be rendered safe against skidding by forming in their faces a number of grooves which will provide full gripping of the ground.

In the grooving of tires, embedded objects such as nails, particles of glass, particles of gravel or the like can strike the cutters and break them. Hence, it is important that the cutters be readily removable. At the same time, the cutters must be positively held in the proper position prior to and subsequent to their replacement. The present invention attains positive positioning of the cutters and also provides ready replacement of the cutters by mounting those cutters in plates that can be slipped into and removed from chucks held by the bracket of the tire grooving machine. It is a simple matter to loosen the chuck and remove a plate, replace the cutter and then insert the plate in the chuck. The entire operation takes only a matter of seconds, and yet the cutters will be perfectly positioned once they are replaced in the chuck. It is therefore an object of the present invention to provide plates that carry the cutters and that are readily inserted in and removed from chucks.

The grooving operation is made easier and quicker where the cutters are heated. However, it is important to keep the cutters electrically inert to protect the worker. The present invention attains these results by mounting the cutter in a hollow rod of heat-conducting material and by mounting a self-contained electrically-insulated heating element in that rod. The heating element is preferably of the cartridge type and it can be replaced readily in the event it burns out. Furthermore, the rod is made hollow to permit heat to be radiated to the cutter and heat is also supplied to the cutter by conduction through the walls of the rod. In this way, a full and efficient heating of the cutters is attained.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 2:
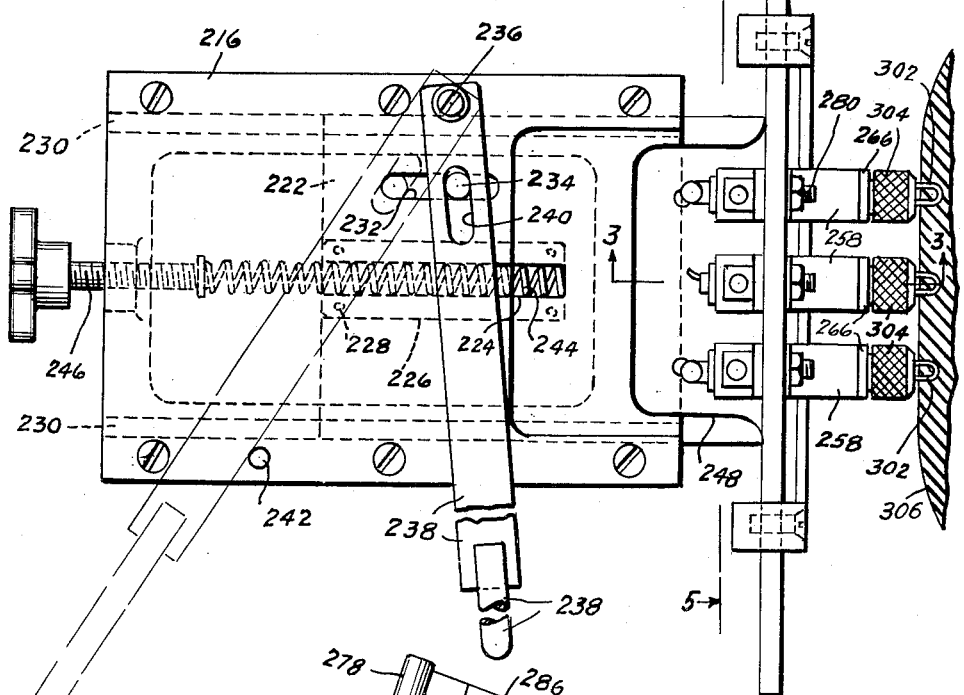
Figure 3:
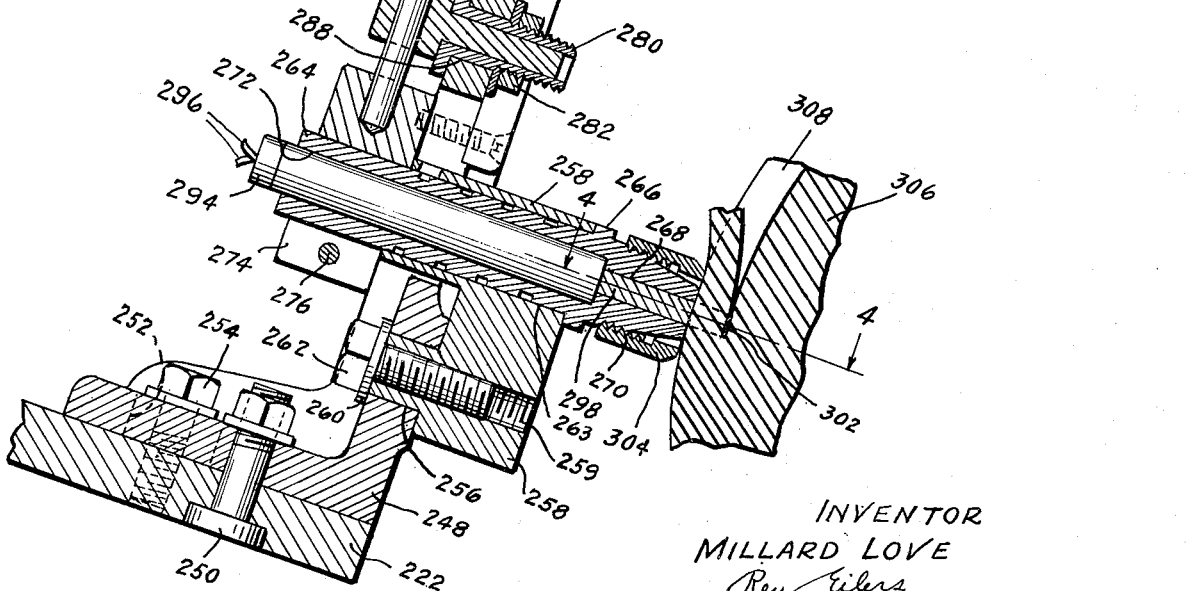

In the drawing,

FIG. 1 is a side elevational view of a tire grooving machine that is made in accordance with the principles and teachings of the present invention, FIG. 2 is a cross sectional view in plan of a portion of the tire grooving machine of FIG. 1, and it is taken along the plane indicated by the line 2—2 of FIG. 1, FIG. 3 is a cross sectional view of the cutter head and bracket of the tire grooving machine of the present invention, and it is taken along the plane indicated by the line 3—3 in FIG. 2, FIG. 4 is an enlarged view through the supporting rod, plate and cutter of FIG. 3, and it is taken along the plane indicated by the line 4—4 in FIG. 3, FIG. 5 is a sectional view of the portion of the tire grooving machine shown in FIG. 2, and it is taken along the plane indicated by the line 5—5 in FIG. 2, and FIG. 6 is a perspective view, in exploded manner, of a portion of the supporting rod and the plate and cutter of the tire grooving machine provided by the present invention.

Referring to the drawing in detail, the numeral 30 denotes a vertically directed channel at one side of the tire grooving machine provided by the present invention. A similar vertically directed channel, not shown, is provided at the opposite side of the tire grooving machine provided by the present invention, and the open faces of those channels are in confronting relation. The two channels are sturdy and provide a rigid support for the tire grooving machine. A top plate 34 spans the two channels and will be suitably secured to those channels as by welding. An angle 36 has one end thereof suitably secured to the channel 30 a short distance above the bottom of that channel, and that angle extends horizontally from that channel. A similar angle, not shown, is similarly secured to the other channel, and that angle also extends in a horizontal direction. The free ends of the two angles are secured together by a transversely extending angle 40. The free ends of the two angles and the angle 40 are supported by two vertically directed angles, one of which is shown as 44. The bottoms of the two vertical angles are level with the bottoms of the two channels, and thus they will hold the tire grooving machine level when it is set on a level support, such as a floor. The upper ends of the two vertical angles are suitably connected together by a horizontal angle, not shown. The two vertical angles will be parallel to the two channels, and two horizontal angles, one of which is shown as 48, will extend between those channels and those vertical angles. The horizontal angle 48 will support a trapezoidal plate 52, while its counterpart will support a similar trapezoidal plate, not shown. These two trapezoidal plates will, in turn, support the opposite ends of a horizontal angle, not shown, which extends transversely of the tire grooving machine. Vertically directed angle 58 and its counterpart extend upwardly from the angle 36 and its counterpart and are connected to the horizontal angle 48 and its counterpart. The angle 58 and its counterpart furnish support for the transversely-extending angle through the medium of the angle 48 and its counterpart and the trapezoidal plate 52 and its counterpart. A generally T-shaped platform which has a thick stem and a narrow cross is denoted by the numeral 62; and that platform has the end of its stem resting upon and secured to the horizontal angle 40. The ends of the T of that platform are secured to the angle 36 and its counterpart. Horizontally disposed angle 64 and its counterpart extend from the two channels to the vertically directed angle 44 and its counterpart. The angle 64 and its counterpart coact with the other angles and with the two channels to provide a strong, sturdy and rigid structure. This structure supports the major part of the active elements of the tire grooving machine of the present invention; and it is shown in greater detail in said co-pending application.

Horizontally disposed angle 68 and its counterpart extend to the right of the two channels, as those channels are viewed in FIG. 1. These angles are in register with the angle 36 and its counterpart of the tire grooving machine. The ends of the angle 68 and its counterpart will be suitably secured to the two channels as by welding. Triangular plate 72 and its counterpart are connected to the two channels and to the angle 68 and its counterpart, as by welding. These triangular plates help stiffen the tire grooving machine of the present invention. The free ends of the angle 68 and its counterpart are connected together by a horizontally directed angle, not shown. The free ends of the angle 68 and its counterpart, and the connecting angle, are supported by vertically directed angle 78 and its counterpart. These latter angles serve as legs for the right hand end of the tire grooving machine provided by the present invention, and they will be suitably secured, as by welding, to the angle 68 and its counterpart and to the connecting angle. The various angles, plates, and channels recited herein will coact to define a strong, sturdy and rigid, but nevertheless light weight, frame for the tire grooving machine of the present invention.

The numeral 82 denotes a ramp which can be secured to the horizontal connecting angle by a pin, not shown. The ramp is preferably made from two angle irons which have been cut away and then bent to define a short vertical leg and an elongated and inclined plane. The two angle irons are suitably connected together by cross pieces, and those cross pieces will preferably be welded to those angle irons. The resulting ramp is light weight but strong and rigid and will be able to guide tires onto the frame of the tire grooving machine of the present invention.

A short angle 86 is secured to the angle 68 a short distance to the right of the channel 30, as that channel is viewed in FIG. 1. A similar short angle is secured to the counterpart of angle 68 a short distance from the counterpart of channel 30; and the two short angles are in register with each other. These angles coact with the two channels to provide a small area into which the pivot portion of a lever 90 extends. That lever has two aligned pivot portions that fit into the space defined by the two short angles with the two channels, it has an elongated arm with a foot pedal thereon, it has two eccentric arms secured to the pivot portion, and it has a connecting rod between the free ends of those eccentric portions. This connecting rod portion of the lever 90 can be rotated upwardly to engage and lift a tire being grooved. The raised position of the connecting rod section of the lever 90 is indicated by dotted lines in FIG. 1. The inactive position of the lever 90 is shown by solid lines in FIG. 1. A sleeve 92 is suitably secured to the horizontal angle 36, as by welding, and that sleeve receives a reciprocable latch 94. The latch 94 has a pin therein, and that pin extends into and is confined by a slot in the sleeve 92. The pin will coact with the slot to permit limited reciprocation of the latch 94. That reciprocation will be sufficient to enable the latch 94 to overlie the lever 90.

The numeral 100 denotes angles which have slotted blocks 106 secured to them. The edges of the slotted blocks 106 are welded to the vertical portions of the angles 100, and they are welded to those vertical portions of the angles in such a way that there is a gap between the top of each block and the under face of the horizontal portion of each angle 100. The spaces that are provided in this manner enable the angles to telescope over the horizontal portion of either the horizontal angle 68 or its counterpart. A bolt 102 extends through a suitable opening in the vertical wall of each angle 100 and through a corresponding opening in each slotted block 106. A washer is telescoped over the threaded end of each bolt 102, and nuts, not shown, hold the bolts 102 and the washers in assembled relation with the slotted blocks 106. A cam-like clamp or lock 108 is mounted in the slot of each block 106, and it rotates about the bolt 102. The cam portion of the lock 108 selectively engages the horizontal wall of the angle 68 or its counterpart to lock the angles 100 against movement relative to those horizontal angles. However, when the locks 108 are lowered down, the cam portions of those locks are not in engagement with the horizontal angle 68 or its counterpart, and the angles 100 can be slid along the horizontal angle 68 or its counterpart with ease. When it is desired to lock the angles 100 relative to the horizontally disposed angle 68 or its counterpart, it is only necessary to press upwardly on the locks 108 and force the cam portions of those locks into binding engagement with the horizontal portions of the angle 68 and its counterpart. The angles 100 thus constitute slides, and those slides carry bearing housings 112. The bearing housings 112 are secured to the angles 100 by bolt and nut combinations 114. The bearing housings 112 support self-aligning bearings, not shown, and those bearings support rotatable shaft 116. The shaft 116 extends transversely of the frame of the tire grooving machine, and it will normally be fixed for rotation in one position. However, whenever it is desired to move the shaft 116, it is only necessary to lower the locks 108 and then telescope the slides 100 along the lengths of the angle 68 and its counterpart. The self-aligning nature of the bearings in the bearing housings 112 avoids all need of precise setting of the slides 100.

A tire-guiding surface 120 is mounted on the shaft 116. This tire-engaging element preferably takes the form of a flanged disk. Another and similar flanged disk is also mounted on the shaft 116. The other flanged disk is suitably locked to the shaft 116, as by a key or a set screw. The flanged disk 120, however, can be reciprocated along the axis of the shaft 116 whenever the split ring of that disk is loosened. However, when that split ring is tightened, as by rotating the bolt 122, the flanged disk 120 is positively locked against accidental reciprocation along the axis of the shaft 116. By loosening the bolt 122, it is possible to move the flanged disk 120 relative to the fixed flanged disk, and this is desirable since it enables those disks to accommodate tires of varying width. The axially extending portions of the disks will receive part of the face of the tire while the generally radially extending portions of the flanges of the disks will confine and guide the sides of the tires. The confinement of the tire need not be overly close, but it must be close enough to avoid wobbling of the tire in the tire grooving machine.

Bearing housing 126 and its counterpart are provided that will fit within and be guided by the channel 30 and its counterpart. These bearing housings support self-aligning bearings, not shown, and those bearings support rotatable shaft 128. That shaft carries a tire-engaging element which is similar to the fixed tire-engaging element on shaft 116. The shaft 128 also carries a reciprocable tire-engaging element 132 which is similar to the reciprocable tire-engaging element 120 on shaft 116. The tire-engaging element 132 has a split ring which permits reciprocation of that element relative to the shaft 128, but it also has a bolt, not shown, which can tighten that split ring and prevent accidental reciprocation. The fixed flanged disk on the shaft 128 is in register with the fixed flanged disk on the shaft 116. The flanged disk 132 will preferably be moved into registry with the flanged disk 120 on the shaft 116. In this way, full and complete alignment of the tire is assured. Each of the bearing housings 126 and its counterpart has two rods 136 extending upwardly therefrom. These rods extend through through spaced openings in spring-confining plates 142. Helical springs 140 surround the rods 136 and bear against the upper surfaces of the bearing housings while also bearing against the under surfaces of the plates 142. Nuts 138 are threaded onto the upper ends of the rods 136 after the plates 142 have been telescoped down over the upper ends of those rods, and those nuts maintain the plates 142 and the springs 140 is assembled relation with the rods 136 and with the bearing housings. Adjusting screws 144, with crank handles on their upper ends, extend through threaded openings in the horizontal plate 34. The lower ends of the adjusting screws 144 extend through openings in the plates 142, and collars 146 and 148 are secured to the lower ends of the adjusting screws 144 immediately above and immediately below the plates 142. The collars 146 and 148 maintain the adjusting screws 144 in assembled relation with the plates 142 while permitting rotation of those adjusting screws relative to those plates. Rotation of the adjusting screws 144 will react with the threaded openings in the horizontal plate 34 to move the plates 142 upwardly or downwardly. Movement of the plates 142 downwardly will compress the helical springs 140 and tend to force the bearing housings downwardly. The degree of force created within the springs 140 can be adjusted very readily by rotation of the adjusting screws 144.

A bearing housing 150 is suitably bolted to the vertical angle 58, and a similar bearing housing is suitably bolted to the counterpart of angle 58. Those bearing housings will be in register with each other. Each of those bearing housings supports a self-aligning bearing, not shown, and those bearings rotatably support the shaft 154. The central portion of the shaft 154 has a number of sharp, axially directed splines formed on it, and those splines will engage the outer face of a tire disposed in the tire grooving machine of the present invention and will drive that tire. Tire-engaging elements 160 and its counterpart, in the form of disks, are mounted on the shaft 154. The said counterpart is in register with the fixed flanged disks. The flange 160 can reciprocate along the length of the shaft 154 whenever the bolt thereon loosens the split ring on that flange. However, suitable tightening of that bolt will lock the flange 160 against accidental reciprocation. The six tire-engaging elements will guide a tire without providing excessive side thrusts on that tire. At the same time, those six tire-engaging elements will fully resist movement of the tire in a sideways direction. The disk portions of the element 120 and its counterpart, and of the element 132 and its counterpart will coact with the splined section of the shaft 154 to provide a tight pressure on the tire. It will be noticed that the shaft 128 is disposed between the shafts 116 and 154. This disposition of the shaft 128 coacts with the spring bias on that shaft to force a tire downwardly against the splines on the shaft 154. Hence, a full and positive driving action can be attained between the tire and the splines on the shaft 154. Thus full and complete driving action will always be present, irrespective of low spots on the surface of the tire, because the springs 140 will enable the tire-engaging element 132 and its counterpart to follow any such low spots and continue to force the tire into driving engagement with the splines on the shaft 154.

A sprocket wheel 156 is suitably secured to the shaft 154, as by being fixedly secured to the fixed flange by bolts. Hence the fixed flange, the shaft 154 and the sprocket wheel 156 will rotate as a unit.

The numeral 166 denotes a reversible gear motor which is secured to the platform 62 by bolts 168. The shaft of the gear motor 166 has a sprocket pinion 170 secured to it by a key or set screw. The sprocket pinion 170 engages and drives the sprocket chain 171. This sprocket chain extends around the sprocket wheel 156 and also drives that wheel. Hence, rotation of the shaft of the gear motor 166 will cause rotation of the driving shaft 154.

Bearing housing 174 and its counterpart are mounted on the horizontal angle which extends between the trapezoidal plate 52 and its counterpart. These bearing housings support a rotatable shaft 176. This shaft has a sprocket pinion 178 mounted thereon, as by a key or set screw. This sprocket pinion also engages the sprocket chain 171, and it too is driven by that sprocket chain. Hence, rotation of the gear motor 166 causes rotation of the shaft 154 and rotation of the shaft 176.

A drum cam 180 is mounted on the rotatable shaft 176, and it will be suitably locked to that shaft by a key or set screw. The cam 180 has two grooves formed therein. Those grooves are well shown in said co-pending application wherein the entire surface of the cam 180 is developed.

A pivot block, not shown, is secured to the counterpart of horizontal angle 64, as by welding, and that pivot block supports a pivot, not shown. This pivot rotatably supports the lever 188, and the lower end of that lever carries a cam follower which extends into and is moved by one of the grooves of cam 180. A slotted pin, not shown, is mounted at the upper end of the lever 188, and that pin is free to rotate relative to the lever 188. A washer is provided on the portion of the slotted pin that extends through the upper end of the lever 188, and a pin extends through the washer and the end of the slotted pin to maintain that slotted pin in assembled relation with the washer and the lever 188. A bolt is mounted adjacent the slot at the opposite end of the slotted pin, and the bolt can be tightened to clamp the slotted end of the slotted pin onto a tie-rod.

Another pivot block is secured to the counterpart of the horizontally disposed angle 64, as by welding. This block supports a pivot, not shown, and a lever 202 pivots about that pivot. The lower end of the lever 202 carries a cam follower that extends into and is guided by the other groove of cam 180. A slotted pin is carried by the upper end of the lever 202, and one end of that pin extends through the upper end of that lever. A collar extends over that projecting end of the slotted pin, and it is secured to that slotted pin by a securing pin. The slotted pin is free to rotate relative to the lever 202, but it is held against accidental separation from that lever by the collar and the securing pin. A bolt is mounted in the slotted end of the slotted pin and that bolt can be tightened to clamp the slotted end of the slotted pin on the tie-rod 292.

A guide plate extends between and is suitably secured to the horizontally directed angle 64 and its counterpart. This guide plate extends transversely of the tire grooving machine provided by the present invention and it guides and confines a cross slide 216. The cross slide is fabricated from machined parts so it can be selectively secured to and separated from the guide plate.

The first-mentioned tie-rod has a cylindrical shank which can be clamped within the slotted end of the first-mentioned slotted pin, and it has an enlarged head which extends within a slot in the cross slide 216. A pin extends through the slot in the cross slide 216 and through an opening in the enlarged head of that tie-rod to prevent accidental separation of that tie-rod from the cross slide 216. Consequently, when the shank of that tie-rod is clamped to the first-mentioned slotted pin, rotation of the lever 188 will cause reciprocation of the cross slide 216. That rotation of the lever 188 is assured by the interaction of its cam follower with the first-mentioned groove in the rotatable drum cam 180.

The cross slide 216 has spaced shoulders 230 on the upper portion thereof, and those spaced shoulders receive and guide platform 222. The shoulders 230 confine the platform 222 for reciprocable movement longitudinally of the tire grooving machine. A slot 224 is machined in the platform 222, and a cover plate 226 is provided on the bottom of the platform 222 to underlie the slot 224. Fasteners 228, such as screws, are used to hold the cover plate 226 in position relative to the platform 222.

A slot 232 is provided in the upper surface of the cross slide 216, and that slot is parallel to the shoulders 230 on that cross slide. A pin 234 extends upwardly from the platform 222, and that pin is disposed within the elongated slot 232. The elongation of the slot 232 permits reciprocable movement of the platform 222 relative to the cross slide 216, but it limits that reciprocable movement to a predetermined length of travel. A pivot 236 is mounted on the cross slide 216 at one side of the slot 232, and that pivot supports a lever 238. This lever extends across and overlies the top of the cross slide 216, and it has an elongated slot 240 in register with the pin 234 on the platform 222. Rotation of the lever 238 about the pivot 236 will force the pin 234, and thus the platform 222, to reciprocate relative to the cross slide 216. A stop 242 is provided on the cross slide 216 at the edge opposite to the edge where the pivot 236 is located. This stop is short in height and the lever 238 can be lifted upwardly to pass over the top of that stop. However, when the lever is not lifted, it will be in register with that stop. As a result, when the lever 238 is moved to the dotted position shown in FIG. 2, the stop 242 will hold that lever against movement to the position shown by solid lines in that figure. However, it is a simple and easy matter to lift the lever 238 upwardly and move it over and beyond the top of the pin 242. A helical spring 244 is disposed within the slot 224 in the platform 222. One end of the spring 244 will bear against the inner end of the slot 224 in the platform 222, while the other end of the spring can selectively bear against the end of a screw 246 that is provided with a readily grasped knob. This screw and knob are denoted by the numeral 246. The screw 246 is suitably mounted in a threaded opening in the cross slide 216, and rotation of the screw 246 will vary the pressure which is applied to the spring 244. That pressure will tend to force the platform 222 to move toward the right hand end of the cross slide 216, as that cross slide is viewed in FIG. 2.

The numeral 248 denotes a bracket with two upwardly extending arms that form a wide U. A pivot 250 extends through the bracket 248 and seats in the platform 222. This pivot holds the bracket 248 in assembled relation with the platform 222 but permits that bracket to rotate relative to that platform. Two arcuate slots 252 are formed in the bracket 248 on opposite sides of the pivot 250, and bolts 254 extend through those slots. These bolts seat in the platform 222, and they can be tightened to clamp the bracket 248 against rotation relative to that platform. Conversely, the bolts 254 can be loosened to permit rotation of the bracket 248 relative to the platform 222.

The bracket 248 has a horizontally directed slot 256 in the vertically directed closed end of the U formed by that bracket. This slot is elongated and it is almost as long as the platform 222 is wide. A number of pivot blocks 258 are mounted in the slot 256 and they have square faced projections disposed within the slot 256 to resist rotation of those blocks relative to that slot. The pivot blocks 258 have threaded openings 259 that can receive the threaded shanks of bolts 262. Washers 260 encircle the shanks of the bolts 262 and bear against the face of the bracket 248. The bolts 262 and the washers 260 can coact with the pivot blocks 258 to lock those pivot blocks in position on the bracket 248. However, the bolts 262 can be loosened to permit the pivot blocks 258 to be slid along the length of the slot 256, and they can even be loosened to permit removal of the pivot blocks 258 from the slot 256. In the particular modification shown in the drawing, three such pivot blocks 258 are shown, but a greater or lesser number of those pivot blocks can be used.

Each of the pivot blocks 258 has an opening 263 therethrough. The opening 263 receives a support 264 in the form of an elongated hollow rod, and the rod 264 telescopes readily within the opening 263 in the pivot block 258. Moreover, the rod 264 can rotate readily relative to the pivot block 258. A radially extending shoulder 266 is provided on the support 264 and that shoulder extends outwardly beyond the outer diameter of the opening 263 in the pivot block 258. Hence, the shoulder 266 limits the extent to which the support 264 can extend into the opening 263.

A recess 268 of rectangular cross section is formed in one end of the support 264. Threads 270 are formed on that same end of the support 264 and a generally frusto-conical surface extends forwardly beyond the threads 270. The recess 268 in the support 264 is contiguous with an elongated recess 272 that extends inwardly from the opposite end of the support 264. Consequently, the support 264 has a passage which extends completely through that support.

The other end of the support 264 extends outwardly from the opening 263, and that projecting end of the support 264 is encircled by a slotted clamp 274. The clamp will telescope snugly around the projecting end of the rod 264, and it has a screw 276 which can be tightened to lock the clamp 274 onto the projecting end of the support 264. Hence, the clamp 274 and the support 264 can be made to rotate relative to the opening 263 in the pivot block 258 as a unit.

The clamp 274 has a pin 278 extending upwardly from the upper end thereof. As indicated by FIG. 3, the pin 278 is preferably embedded in the upper end of that clamp. The upper end of the pin 278 extends through an opening in a pivot 284. This pivot is rotatably mounted in a pivot block 280 which is held in a slot 288 of a connecting rod 286. The pivot block 280 has a threaded portion that can receive a nut 282. When the nut 282 is tightened on the threaded portion of the pivot block 280, that nut will bear against the connecting rod 286 and prevent relative movement between the pivot block and the connecting rod. However, when the nut 282 is loosened, the pivot block 280 can be slid along the length of the slot 288 in the connecting rod 286.

The connecting rod 286 has one end thereof bent transversely of the axis of that rod. A slot is formed in the transversely bent end of the connecting rod 286 and that slot releasably receives the tie-rod 292 which is held by the second-mentioned slotted pin. This tie-rod has two shoulders formed thereon, and those shoulders are disposed on opposite sides of the transversely directed end of the connecting rod 286. Those shoulders prevent accidental separation of the tie-rod 292 from the connecting rod 286. However, those shoulders do not bind with the transversely extending end of the connecting rod 286, and this fact plus the existence of the slot permits the tie-rod 292 to move relative to the connecting rod 286. Thus the tie-rod 292 and the connecting rod 286 have a sliding connection therebetween.

The recess 272 in the support 264 can receive a self-contained electrically-insulated resistance element 294. Preferably this resistance element will be of the cartridge type that can readily be inserted in the recess 272 and withdrawn from that recess as a unit. This unit will fit the opening or recess 272 in the support 264 rather snugly but it will be readily removed from that recess when desired. Leads 296 extend outwardly from the rear end of the cartridge resistance element 294, and those leads extend to a switch 310. This switch is suitably mounted on the horizontally disposed angle at the top of vertical angle 44 and its counterpart.

A generally rectangular plate 298 is provided that can be disposed within the recess 268 of the support 264. The forward end of the plate 298 has a chamfer at each side thereof and that chamfer is generally similar to the angularity of the conical portion of the support 264. However, the chamfered faces of the plate 298 project outwardly beyond the conical face of the support 264. Two slots 300 extend inwardly from the forward face of the plate 298. Those slots are inclined relative to each other and they are further apart adjacent the rear of the plate 298 than they are adjacent the front edge of that plate. These slots define a central anvil for the plate 298 and also define two bendable fingers for that plate. A generally U-shaped cutter or knife 302 is disposable in the slots 300 of the plate 298. The cutter 302 is made of spring steel and it is resilient.

Hence, while the cutter 302 has the arms thereof inclined apart at a predetermined angle, that angle can be varied slightly. The cutter 302 is generally U-shaped and has a smoothly rounded closed end. The cutter 302 is sharpened so that it is sharp on both of its faces. Specifically, the cutter 302 is sharpened to a knife edge at its upper edge and its lower edge, and it has a ridge extending along its inner surface where the cutting edges terminate. That ridge and those cutting edges do not extend all the way to the ends of the arms of the cutter 302; instead the end portions of the arms of the cutters are left flat to secure positive positioning of the cutter 302 in the slots 300 of the plate 298.

The smoothly rounded closed end of the cutter 302 and the inclined disposition of the legs of that cutter are important since they enable that cutter to resist breakage to a remarkable extent. The smoothly rounded configuration of the closed end of the cutter avoids the concentration of stresses and fatigue forces at any one point in the end of the cutter, and the inclination of the legs enables those legs to resist side thrusts. Consequently, the cutter provided by the present invention is remarkably strong and resistant to breakage.

A threaded retainer 304 is provided which can telescope over the cutter 302 and can telescope over the plate 298. That threaded retainer, which is best shown in FIG. 4, has a conical surface at its interior adjacent the outer end thereof. This conical surface will coact with the chamfered ends of the bendable fingers of plate 298 to force those fingers into locking engagement with the knife or cutter 302. Hence, the retainer 304 and the support 264 coact with the plate 298 to constitute a readily loosened and tightened chuck for the cutter 302. To insert a new cutter 302, it is only necessary to loosen the retainer 304 on the threads 270, and pull the legs of the old cutter out of the slots 300. Thereafter, the legs of the replacement 302 can be squeezed together until they are in register with the slots 300, and then those legs can be moved into those slots.

The distance between the closed end of the cutter 302 and the outer face of the plate 298 can be adjusted; the resiliency of the cutter 302 making this possible. This variation is important since that distance directly determines the depth of the groove formed by the cutter 302. To set that distance, a gage can be inserted between the closed end of the cutter 302 and the outer end of the plate 298, the cutter 302 can be pressed tightly against that gage, the retainer 304 can be tightened onto the threads 270, and the gage can be removed. The tightening of the retainer 304 will positively lock the cutter 302 against movement relative to the plate 298 and to the rod 264. The outer end of the retainer 304 is smooth, and it will rest against the face of the tire during the grooving operation. The cutter 302 will, of course, project beyond the end of the retainer 304 and will extend into the surface of the tire. The numeral 306 denotes a typical tire to be grooved; and that tire can be given the highly desirable diagonal grooves shown in said copending application.

A second switch is mounted adjacent the switch 310; and that second switch controls the operation of the reversible gear motor 166. A suitable flexible lead 314 extends from the two switches to a wall plug, and the lead 312 extends from the second switch to the motor 166.

In using the tire grooving machine of the present invention to groove a tire, the operator establishes the position of the cutters 302 relative to the bracket 248. This is done by rotating the shaft of the motor 166, as by inserting a wrench in the socket of the shaft of the motor and rotating that wrench. Such rotation will cause slow movement of the sprocket chain 171 and slow movement of the shaft 176. This rotation of the shaft 176 will rotate the drum cam 180 and will force the cam followers to follow the grooves in that cam. The movement of the cam followers will cause rotation of the levers 188 and 202. This rotation will cause transverse movement of the cross slide 216.

Thereupon, the operator will check to see whether the center cutter is in register with the center of the tire. If it is, the grooving operation can be commenced. If it is not, the operator moves the first-mentioned tie-rod and the cross slide 216 until the center cutter 302 is in register with the center of the tire.

At this time the lever 238 can be raised upwardly above the top of stop 242, and then that lever can be moved forwardly to move the platform 222 and bracket 248 toward the tire. Such movement will place the cutters 302 in engagement with the tire 306. If those cutters are already hot, it will not be necessary to close the switch 310. However, if the resistance elements 294 are cool, closing of the switch 310 will provide prompt heating of those cutters. As soon as the cutters 302 are hot enough, the operator closes the second switch and the motor 166 starts to rotate. Rotation of the motor 166 will cause rotation of the sprocket pinion 170 and will thus cause movement of the sprocket chain 171. This forces positive rotation of the shaft 154 and of the shaft 176 through the sprocket wheel 156 and the sprocket pinion 178. The rotation of the shaft 154 will cause the tire 306 to rotate, and rotation of the shaft 176 will cause transverse movement of the cross slide 216 and reciprocable movement of the connecting rod 286. The movement of the cross slide 216 and the movement of the connecting rod 286 are precisely controlled by the drum cam 180.

The grooves of the drum cam 180 are interrelated so that whenever the cross slide 216 moves to the right, the cutters 302 will be rotated to the right of dead center. Those cutters will assume a position which is the resultant of the right hand movement of the cross slide 216 and the circumferential movement of the tire 306. As a result, the cutters 302 will be positioned directly parallel to the relative path of movement between those cutters and that tire. This assures smooth and easy grooving of the tire. When the cross slide 216 reaches the end of its right hand path of movement, the lever 202 will rotate and move the connecting rod 286. This movement will cause the pivot clamps 274 to rotate in the openings 263 in the pivot blocks 258, and those clamps 274 will move the cutters 302 through dead center to the left of dead center. As a result, those cutters will quickly assume a position which is parallel to the resultant of the left hand movement of the cross slide 216 and the circumferential movement of the tire 306. Hence, those cutters will be able to form the reverse part of the zig zag groove desired in the tire 306.

The cam 180 provides a more rapid movement at the beginning of each change of direction than it does during the rest of its movement. This is necessary because the rubber of the tire is resilient and it distorts ahead of the cutters. Hence, when the cross slide 216 has reached the end of one of its paths of movement and starts to move in the opposite direction, the rubber will recover itself and will then have to be distorted in the opposite direction before full cutting can occur. Hence, one of the grooves provides a more rapid movement of the cross slide 216 at the beginning of each path of movement of the cross slide 216 to assure full cutting of the tire by compensating for the yield in the surface of that tire.

The grooves of cam 180 are interrelated in such a way that the cutters 302 are rotated into the direction of the cut and then kept there until the direction of movement of the cross slide 216 is to be changed.

The motion of the lever 202 is transmitted to the cutters 302 by the second-mentioned tie-rod, the connecting rod 286, the pivots 284, the clamps 274 and the rods 264. The pivots 284 are forced to move with the connecting rod 286 by reason of the fact that they are mounted in the pivot blocks 280. As those pivots move, they will cause the clamps 274 to rotate the supports 264; those supports being held for rotation by the openings 263 in the pivot blocks 258. As the clamps 274 rotate, the rods 278 thereon will reciprocate relative to the openings in the ends of the pivots 284.

The motor 166 rotates the tire 306 in a clockwise direction, as that tire is viewed in FIG. 1. This is desirable since it enables the operator to see how the grooving is proceeding. For example, if a stone or nail or piece of glass was embedded in the tire and struck and broke one of the cutters 302, the operator would know it immediately. If the tire 306 was rotating in the opposite direction, the operator might not notice the breaking of a cutter as promptly.

The grooving operation continues until the tire is completely grooved. The tire grooving machine of the present invention provides any desired number of grooves in the surface of the tire and will form all of those grooves simultaneously. When the grooving operation is completed, and that operation requires less than three minutes, the operator opens the second switch to stop further rotation of the motor 166. If additional tires are to be grooved, the switch 310 is left closed; otherwise that switch is also opened. The lever 238 is then rotated in a clockwise direction, as that lever is viewed in FIG. 2, and the outer end of that lever is lifted upwardly to pass over the stop 242. This movement of lever 238 will move the cutters 302 rearwardly and out of engagement with the tire 306. Thereupon, the operator will rotate the lever 90 to the position shown by dotted lines in FIG. 1. At such time, the tire can then be rolled to the right until it reaches and rolls down the ramp 82.

If one of the cutters 302 is broken during the grooving operation, as by being struck by an embedded nail or piece of glass, the operator need only move the second switch to a position where it halts further rotation of the motor 166. Then the operator need only pull the lever 238 rearwardly and set it in engagement with the latch 242. He should then use the second switch to reverse motor 166 and "back" the tire 306 to a point where fully cut grooves register with the cutters 302. He should then loosen the retaining ring 304, pull out the broken cutter 302 with its plate 298, remove the broken cutter legs from the slots 300 and then insert a new cutter. Once this has been done, the plate 298 is replaced, the threaded retainer 304 is replaced, the lever 238 is moved forwardly to permit the spring 244 to urge the cutters 302 back into the grooves, and then the second switch is again moved to the forward position.

The forward and backward movement of the platform 222 must be accommodated and yet the lever 202 must provide positive driving of the connecting rod 286 which is carried by the bracket 248 mounted on the platform 222. This combined result is attained by the slot in the transversely extending end of the connecting rod 286. That slot directly and immediately transmits the forces from the second-mentioned tie-rod to the connecting rod 286, but also permits that connecting rod to move transversely of the lever 202 when the platform 222 is moved.

The distance between the grooves formed by the cutters 302 can be varied by loosening the nuts 282 on the threaded ends of pivot blocks 280 and moving those pivot blocks relative to the connecting rod 286. Simultaneously, the pivot blocks 258 should be moved relative to the slot 256 in the bracket 248, and this is done by loosening the bolts 262. Any desired spacing between the cutters 302 can be attained; and the total number of grooves to be cut can be varied by adding or removing further pivot blocks 258 and cutters 302. The drawing shows three cutters 302, but more than three cutters can be used if desired. However, the use of three cutters has been found to be very acceptable.

The platform 222 is biased toward the tire 306 by the spring 244, and that platform will urge the bracket 248 and the cutters 302 toward the tire 306. The cutters will extend into the surface of tire 306, but the smooth faces of the threaded retainers 304 will bear against the face of the tire and limit the distance to which the cutters 302 can extend into the tire. High spots in the tire will force the retainers 304 to move the bracket 248 and platform 222 rearwardly; while low spots in the tire will enable the retainers 304 and the bracket and platform to move forwardly. The overall result is that the threaded retainers 304 follow the surface of the tire and hold the closed ends of the cutters 302 a fixed distance below the surface of the tire. This assures uniform groove depth.

As explained above, the depth of that groove can be varied by varying the distances which the closed ends of the cutters 302 project beyond the threaded retainers 304. The resilient nature of the cutters 302 makes this possible. The width of those grooves can also be varied by using plates 298 with different spacings between the grooves 300, and by using cutters with different spacings between the legs thereof. Grooves as narrow as one eighth of an inch or as wide as three eighths of an inch can be cut.

The cutters 302 of the present invention have sharp cutting edges at their upper and lower faces. One of those cutting edges will be used until it is dulled, and then the cutter 302 is turned over. The second edge will then be used until it too is dulled. Hence the cutters can be used twice as long as the ordinary cutters.

FIG. 2 emphasizes the fact that the central support 258 is shorter than either of the other two supports. This is important since tires have crowned faces. By being shorter, the central support 258 compensates for the crown configuration of the tire, and it assures full seating of all three retainers 304 against the tire face.

At the conclusion of the grooving of tires for any particular period, the switch 310 should be opened to to permit the heating elements 294 to cool. In the event one of these heating elements burns out, it can be readily replaced by simply pulling it out of the recess in the upper end of the support 264 and by inserting a new heating element. The leads 296 of the old heating element will be disconnected and the leads of the new heating element will be connected in their stead.

Whereas the drawing and accompanying description have shown and described a preferred embodiment of the present invention it should be apparent to those skilled in the art that various changes may be made in the form of the invention without affecting the scope thereof.

What I claim is:

1. A cutter head for a tire-grooving machine that is supportable by a pivot block of said tire-grooving machine and that comprises a rod, a recess in one end of said rod, threads on said one end of said rod, a support that is releasably disposable in said recess, said recess being dimensioned to hold said support against rotation relative to said rod, slots in said support that extend inwardly from one face of said support to define an anvil and two elongated and bendable fingers, a U-shaped knife that has the legs thereof disposable within said slots in said support, and an annular retainer that has threads thereon to engage and be held by the said threads on said one end of said rod, said annular retainer telescoping over the end of said knife and engaging said fingers of said support to clamp the legs of said knife between said anvil and said fingers and thereby prevent rotation of said knife relative to said support, said rod having a portion of the exterior thereof that is circular in cross section and that is disposable within and rotatable relative to said pivot block to facilitate rotation of said support and of said knife relative to said pivot block.

2. A cutter head for a tire-grooving machine that comprises a rod, a recess in one end of said rod, threads on said rod, a support that is releasably disposable in said recess, slots in said support that extend inwardly from one face of said support to define an anvil and two elongated and bendable fingers, a U-shaped knife that has the legs thereof disposable within said slots in said support, and an annular retainer that has threads thereon to engage and be held by the said threads on said rod, said annular retainer telescoping over the end of said knife and engaging said fingers of said support to clamp the legs of said knife between said anvil and said fingers, said slots in said support being inclined relative to each other and being spaced further apart at their inner ends than they are at said one face of said support, said knife having a smoothly rounded closed end and having the legs thereof inclined outwardly and away from each other.

3. A cutter head for a tire-grooving machine that is supportable by a pivot block of said tire-grooving machine and that comprises a rod, a recess in one end of said rod, threads on said one end of said rod, a surface on said rod that coacts with an adjacent surface on said pivot block to limit axial movement of said rod relative to said pivot block, a support that is releasably disposable in said recess, slots in said support that extend inwardly from one face of said support to define an anvil and two elongated and bendable fingers, a U-shaped knife that has the legs thereof disposable within said slots in said support, and an annular retainer that has threads thereon to engage and be held by the said threads on said one end of said rod, said annular retainer telescoping over the end of said knife and having a portion thereof engaging said fingers of said support to clamp the legs of said knife between said anvil and said fingers and thereby prevent rotation of said knife relative to said support, said rod having a portion of the exterior thereof that is circular in cross section and that is disposable within and rotatable relative to said pivot block to facilitate rotation of said support and of said knife relative to said pivot block, said knife having cutting edges at both sides thereof and being reversible to present either cutting edge to the tire being grooved.

4. In a tire grooving machine the improvement which comprises a bracket movable toward and away from a tire to be grooved, a support mounted on said bracket for conjoint movement therewith, said support having a recess of rectangular cross section in one end thereof, a plate of rectangular cross section releasably disposed in said recess, slots in said plate that define an anvil and two elongated bendable fingers, a cutter that has legs disposable in said slots in said plate and within said recess, a retainer that telescopes over said cutter and over said fingers of said plate to clamp said legs of said cutter intermediate said anvil and said fingers, said cutter projecting outwardly beyond the outer end of said retainer and beyond the outer end of said support, said plate having the outer end thereof adjacent to the outer end of said retainer, and a member to bias said bracket for movement toward the tire, said support responding to the biased movement of said bracket to move said cutter to penetrate the thread of said tire and responding to low spots on said tread of said tire to move said cutter further into the tread of said tire, one of said outer ends bearing against the tread of said tire to limit the extent of cutter penetration and responding to high spots on said tread, whereby said groove formed by said cutter can be of substantially constant depth irrespective of low spots and high spots on said tread of the tire.

References Cited in the file of this patent

UNITED STATES PATENTS

| | | |
|---|---|---|
| 2,000,129 | Dunnam | May 7, 1935 |
| 2,031,028 | Boyet et al. | Feb. 18, 1936 |
| 2,031,472 | Errig et al. | Feb. 18, 1936 |
| 2,140,478 | Mossback | Dec. 13, 1938 |
| 2,570,762 | Caliri | Oct. 9, 1951 |
| 2,618,056 | Van Alstine | Nov. 18, 1952 |